United States Patent
Kleyman et al.

(10) Patent No.: US 9,292,397 B1
(45) Date of Patent: Mar. 22, 2016

(54) LIGHT-WEIGHT METHOD AND APPARATUS FOR TESTING NETWORK DEVICES AND INFRASTRUCTURE

(71) Applicant: NETLOAD, INC., Danville, CA (US)

(72) Inventors: Alexander Michael Kleyman, Danville, CA (US); Yakov Teplitsky, Cupertino, CA (US)

(73) Assignee: NETLOAD, INC., Danville, CA (US)

( * ) Notice: Subject to any disclaimer, the term of this patent is extended or adjusted under 35 U.S.C. 154(b) by 339 days.

(21) Appl. No.: 13/894,063

(22) Filed: May 14, 2013

Related U.S. Application Data

(60) Provisional application No. 61/688,387, filed on May 14, 2012.

(51) Int. Cl.
*G06F 11/26* (2006.01)
*G06F 11/263* (2006.01)
*G06F 11/22* (2006.01)

(52) U.S. Cl.
CPC ............ *G06F 11/263* (2013.01); *G06F 11/221* (2013.01)

(58) Field of Classification Search
CPC . G06F 11/1625; G06F 11/1443; G06F 11/22; G06F 11/221
USPC .......................................................... 714/43
See application file for complete search history.

(56) References Cited

U.S. PATENT DOCUMENTS

| | | |
|---|---|---|
| 6,628,440 B1 | 9/2003 | Bateman |
| 6,654,701 B2 | 11/2003 | Hatley |
| 6,664,466 B2 | 12/2003 | Bailey |
| 6,728,929 B1 | 4/2004 | Luong |
| 6,734,684 B2 | 5/2004 | Golo |
| 6,840,974 B2 | 1/2005 | Bailey |
| 6,871,312 B2 | 3/2005 | Hatley |
| 6,880,078 B2 | 4/2005 | Rabinovich |
| 6,898,272 B2 | 5/2005 | Talalai |
| 6,922,464 B2 | 7/2005 | Bailey |
| 6,959,037 B2 | 10/2005 | Bailey et al. |
| 6,993,127 B2 | 1/2006 | Bailey |
| 7,065,180 B2 | 6/2006 | Bailey |
| 7,085,238 B2 | 8/2006 | McBeath |
| 7,100,091 B2 | 8/2006 | Nakamoto |
| 7,158,907 B1 | 1/2007 | Soldo |
| 7,181,360 B1 | 2/2007 | Nikolac et al. |
| 7,194,496 B2 | 3/2007 | Morris |
| 7,260,152 B2 | 8/2007 | Golo |
| 7,260,185 B2 | 8/2007 | Bailey |
| 7,274,746 B2 | 9/2007 | Bailey |
| 7,298,827 B1 | 11/2007 | Talalai |
| 7,356,077 B2 | 4/2008 | Fala et al. |

(Continued)

*Primary Examiner* — Chae Ko
(74) *Attorney, Agent, or Firm* — Foley & Lardner LLP; Mark J. Danielson

(57) ABSTRACT

The present invention relates generally to networking, and more particularly to techniques and products for verifying, qualifying and/or quantifying the performance of networking devices and infrastructure. According to certain aspects, test equipment according to embodiments of the invention performs stress tests using both client and server emulation with very low overhead, providing a virtually unlimited number of servers and/or clients. According to further aspects, tests include the transfer of real files between clients and servers, not just test patterns. According to further aspects, test equipment includes an easy to use Web GUI interface. According to further aspects, tests are performed using TCP protocol, which is the predominant form of network traffic.

16 Claims, 6 Drawing Sheets

(56) References Cited

U.S. PATENT DOCUMENTS

| | | |
|---|---|---|
| 7,369,605 B2 | 5/2008 | Eyres |
| 7,434,099 B2 | 10/2008 | Flynn et al. |
| 7,489,706 B2 | 2/2009 | Hatley et al. |
| 7,506,283 B2 | 3/2009 | Bailey et al. |
| 7,580,732 B2 | 8/2009 | Bailey |
| 7,594,159 B2 | 9/2009 | Fujikami et al. |
| 7,620,989 B1 | 11/2009 | Couturier et al. |
| 7,660,331 B1 | 2/2010 | Faradjev et al. |
| 7,684,587 B2 | 3/2010 | Chen et al. |
| 7,826,381 B1 | 11/2010 | Kestuar et al. |
| 7,869,381 B1 | 1/2011 | Hatley et al. |
| 7,872,987 B1 | 1/2011 | Hatley et al. |
| 7,872,988 B1 | 1/2011 | Hatley et al. |
| 7,933,220 B2 | 4/2011 | Hatley et al. |
| 7,957,323 B2 | 6/2011 | Uyehara et al. |
| 7,958,387 B2 | 6/2011 | Silverman et al. |
| 7,961,637 B2 | 6/2011 | McBeath |
| 7,961,847 B2 | 6/2011 | Bailey |
| 7,995,490 B2 | 8/2011 | Bailey et al. |
| 8,027,807 B2 | 9/2011 | May et al. |
| 8,054,946 B1 | 11/2011 | Kronrod et al. |
| 8,102,776 B2 | 1/2012 | Fujikami |
| 8,146,125 B2 | 3/2012 | Grinkemeyer et al. |
| 8,264,972 B2 | 9/2012 | Joyner |
| 8,310,952 B2 | 11/2012 | Hatley et al. |
| 8,359,653 B2 | 1/2013 | Guruswamy |
| 8,433,811 B2 | 4/2013 | Guruswamy et al. |
| 2003/0088664 A1* | 5/2003 | Hannel et al. ................. 709/224 |
| 2003/0108044 A1* | 6/2003 | Hendel ........................ 370/392 |
| 2004/0022367 A1 | 2/2004 | Talalai |
| 2005/0041592 A1* | 2/2005 | Hannel et al. ................. 370/241 |
| 2005/0213586 A1* | 9/2005 | Cyganski et al. ........ 370/395.41 |
| 2005/0278639 A1* | 12/2005 | Becker ........................ 715/741 |
| 2006/0088060 A1 | 4/2006 | Fujikami et al. |
| 2006/0119995 A1 | 6/2006 | Bailey |
| 2006/0209968 A1 | 9/2006 | Eyres et al. |
| 2006/0269162 A1 | 11/2006 | Chen et al. |
| 2007/0165672 A1* | 7/2007 | Keels et al. .................. 370/474 |
| 2007/0257838 A1 | 11/2007 | Chen |
| 2007/0291908 A1 | 12/2007 | Bailey |
| 2008/0198742 A1* | 8/2008 | Kaempfer .................... 370/230 |
| 2008/0276001 A1 | 11/2008 | Menon |
| 2008/0313620 A1 | 12/2008 | Oliver |
| 2009/0059804 A1 | 3/2009 | Fujikami et al. |
| 2009/0262743 A1 | 10/2009 | Uyehara et al. |
| 2009/0296590 A1 | 12/2009 | Joyner |
| 2009/0300419 A1 | 12/2009 | Silverman et al. |
| 2010/0061378 A1 | 3/2010 | Joyner |
| 2010/0114529 A1 | 5/2010 | May |
| 2010/0254568 A1 | 10/2010 | Chen et al. |
| 2011/0001833 A1 | 1/2011 | Grinkemeyer et al. |
| 2011/0051614 A1* | 3/2011 | Li et al. ....................... 370/252 |
| 2011/0072307 A1 | 3/2011 | Hatley |
| 2011/0124295 A1 | 5/2011 | Mahjoubi Amine |
| 2011/0173498 A1 | 7/2011 | Hatley et al. |
| 2011/0231437 A1 | 9/2011 | Silverman |
| 2011/0257923 A1 | 10/2011 | Boulton |
| 2011/0299570 A1 | 12/2011 | Reed |
| 2011/0306306 A1 | 12/2011 | Reed |
| 2012/0230208 A1* | 9/2012 | Pyatkovskiy ................ 370/250 |
| 2013/0044604 A1 | 2/2013 | Hatley |
| 2013/0347103 A1 | 12/2013 | Veteikis et al. ............... 726/22 |

* cited by examiner

US 9,292,397 B1

LIGHT-WEIGHT METHOD AND APPARATUS FOR TESTING NETWORK DEVICES AND INFRASTRUCTURE

CROSS-REFERENCE TO RELATED APPLICATIONS

The present application claims priority to U.S. Prov. Appln. No. 61/688,387, filed May 14, 2012, the contents of which are incorporated by reference herein in their entirety.

FIELD OF THE INVENTION

The present invention relates generally to networking, and more particularly to techniques and products for verifying, qualifying and/or quantifying the performance of networking devices and infrastructure.

BACKGROUND OF THE INVENTION

Various techniques and products exist for verifying, qualifying and/or quantifying the performance of networking devices and infrastructure. One existing technique is to generate traffic destined for a device under test (DUT) at the full bandwidth and maximum connection rates of the device. This stresses networking equipment by causing constant setup/teardown of stateful (e.g. TCP) connections and exposing weakness in processing, memory access, and other areas. The true performance of the equipment can then be determined with capability of the DUT to keep up with connection rate, Goodput (i.e. the amount of throughput that is the actual bits/s of data to be transferred without any overhead) measurements through the DUT, and the number of concurrent connections that are opened at any given time.

However, these and other existing techniques have many shortcomings. Many of them use off-the-shelf TCP stacks (e.g. Linux) with some modifications. In such cases sending a packet incurs a large amount of system overhead, making the equipment complex and expensive to generate high traffic rates. That, combined with complexity of configuring the existing equipment, requires extensive investment in both capital expenditures and operating expenditures on the user side. To get around the complexity and performance bottlenecks, some techniques use custom test patterns, which may not reflect actual real-world network traffic. A need remains, therefore, for test equipment that can be easily used by development professionals, sales professionals, and network infrastructure professionals and can reliably provide consistent results across the board.

SUMMARY OF THE INVENTION

The present invention relates generally to networking, and more particularly to techniques and products for verifying, qualifying and/or quantifying the performance of networking devices and infrastructure. According to certain aspects, test equipment according to embodiments of the invention performs stress tests using both client and server emulation with very low overhead (e.g. using a "light-weight" version of TCP), providing a virtually unlimited number of simulated servers and/or clients with relatively low resources required. According to further aspects, tests include the transfer of real files between clients and servers, not just test patterns. According to further aspects, test equipment includes an easy to use Web GUI interface. According to further aspects, tests are performed using TCP protocol, which is the predominant form of network traffic.

In accordance with these and other aspects, a method according to embodiments of the invention includes initiating, using computer implemented test equipment, a test transaction via a network device under test using transmission control protocol (TCP), the test transaction comprising a plurality of packets; and completing the test transaction comprising the plurality of packets without maintaining TCP state information at the test equipment.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
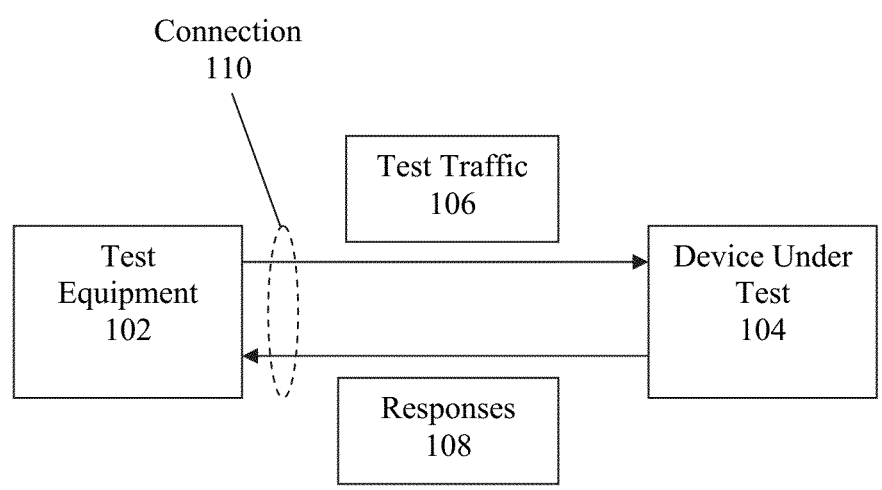
FIG. 1 is a block diagram illustrating an example test environment according to embodiments of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present inventors recognize that existing traffic generation techniques for characterizing performance of network devices and infrastructure use both Stateless (UDP-like) and Stateful (TCP) traffic. However, TCP/HTTP client-server traffic is the most prevalent type of traffic on the Internet and most networks. A problem is that TCP is a very heavy protocol that requires many compute resources from both networking equipment and client and server nodes. For example, a conventional TCP stack requires substantial overhead to maintain a state of every open connection, including keeping copies of sent packets until an acknowledgment is received. The present inventors further recognize that TCP traffic is affected by issues such as throughput, latency, packet reordering, and packet loss, which together combine to affect Goodput of the DUT and the overall network. Further, the present inventors recognize that if the test equipment does not need to compensate for the packet loss and packet reordering, the test equipment embodied in the present invention can be implemented with a significantly reduced overhead and with very little or no state created in the equipment itself for each TCP flow, thereby reducing the overhead of the system and increasing its performance by a significant margin.

FIG. 1 is a block diagram illustrating example aspects of the invention. In the example implementation shown in FIG. 1, test equipment 102 sends test traffic 106 to device under test (DUT) 104 via connection 110. In response, DUT 104 sends responses 108. Based on the sent traffic 106 and responses 108, test equipment 102 measures the performance and/or capabilities of DUT 104.

Test equipment 102 can be a PC or network processor based platform. In one example, test equipment 102 is a rack mounted network device running an operating system such as Unix or Linux and having application software implementing the test functionality to be described in more detail below. In embodiments, application software in test equipment 102 further provides a Web based graphical user interface by which users can set up and perform tests and view results. Example implementations of test equipment 102 according to the invention are embodied in Developer, Performer and Qualifier products of NetLoad, Inc. of Danville, Calif.

Device under test (DUT) 104 can be any type of network device including servers, clients, load balancers, firewalls, NAT devices, intrusion prevention devices, etc.

Connection 110 can depend on the complexity of the particular test environment. In one example where test equipment 102 is a rack mounted network device located near or in the same rack as DUT 104, connection 110 is an Ethernet connection and cable (e.g. including one or more 10/100/1000 Mbit/s ports, 10 Gbit/s ports, 40 Gbits/s ports, 100 Gbits/s ports, etc.). In other example environments where equipment 102 and DUT 104 are more remotely located, connection 102 can include private or public local or wide area networks. As described in more detail below, connections can be configured with the test equipment acting as either or both of a client and server, typically using separate Ethernet ports.

According to aspects of the invention, test traffic 106 is designed to stress DUT 104 by causing constant setup/teardown of stateful connections and exposing weakness in processing, memory access, and other areas. In one example implementation, test traffic 106 comprises TCP/HTTP traffic from clients and/or servers that are simulated by test equipment 102. In example embodiments of the invention, to generate test traffic 106, test equipment 102 creates simulated clients that setup TCP/HTTP connections with simulated servers and utilize a GET process to request and transfer files or pages via DUT 104. In other embodiments where the DUT 104 is a client or server, test equipment 102 can only simulate a server or client, respectively.

According to aspects of the invention, the file transfer process uses real-world files or pages. This allows more real-world traffic emulation as opposed to custom test patterns used in some conventional techniques, and further allows for injection of any user data including malicious content. In example embodiments, the user is enabled to provide a list of files to be transmitted inside each connection, with weights assigned to frequency of file transmission. The files can have any content, including malicious content. The user can also test Firewall and URL blocking/redirection/termination functions of their DUT by uploading a virtually unlimited list of files with parameters including source and destination IP of the TCP flow and the URL for the connection, so the test equipment can verify that proper action was taken for each URL by the DUT.

Although embodiments of the invention will refer to use of TCP/HTTP, it should be apparent that the methods and apparatuses of the invention can include multi-protocol support for additional protocols such as HTTPS, FTP, etc. Moreover, although the HTTP GET process will be described, other types of processes such as HTTP PUT, etc. could also be used.

Responses 108 are standard network protocol responses from DUT 104. According to aspects of the invention, no special software or network processing is needed on DUT 104 to evaluate the performance of DUT 104. Rather, all processing is performed by test equipment 102 using traffic 106 and DUT 104 operating as under normal conditions. This allows for the true performance of DUT 104 to be evaluated with Goodput measurements.

Figure 2:
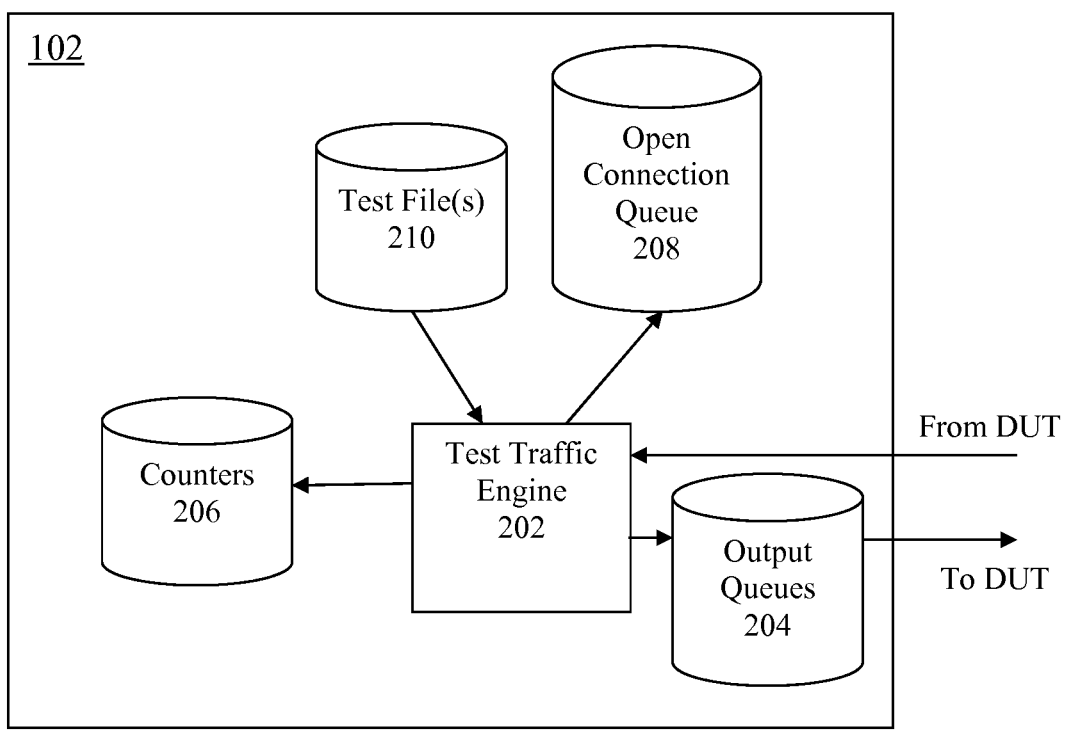
FIG. 2 is a block diagram illustrating an example implementation of test equipment according to embodiments of the invention.

An example embodiment of test equipment 102 according to the invention is illustrated in FIG. 2.

In general, test traffic engine 202 generates packets associated with active connections corresponding to entries in queue 208 that are queued for transmission to DUT 104. Based on packets sent by engine 202 and responses received from DUT 104, engine 202 updates counters 206 and can generate further packets for transmission to DUT 104. The payload of packets generated by engine 202 can be based on test file(s) 210. Additionally or alternatively, the contents can be generated on the system to create a particular size payload with a random ASCII pattern.

According to aspects of the invention, engine 202 uses a "Light-Weight" version of TCP to simulate, at high rates and with relatively low computing resources, a wide range of network conditions and TCP algorithms including slow start, congestion, packet re-ordering, packet loss, packet retransmission, etc. Using this "light-weight" version of TCP, embodiments of the invention provide extremely high bandwidth of connections with 1-byte and higher transaction sizes (i.e. connection setup and teardown with 1 byte and higher of Goodput transferred). According to some aspects, this "light-weight" version of TCP can be considered stateless TCP. In example embodiments, after forming a TCP SYN packet at the beginning of a transaction, all other TCP packets for the transaction are a built (generated) based on the context of the received packet. In contrast to conventional TCP stacks, therefore, no per TCP connection information is stored to help with generation of packets.

Engine 202 schedules packets for delivery via output queues 204. In embodiments, only packets that would cause the server to ack or to start new file, are kept in the queues 204 for a given amount of time. Otherwise, packets are sent from queues 204 to DUT 104 on an as-available basis.

According to test results, engine 202 maintains counters 206. These counters can include various performance measurements such as number of opened connections, number of closed connections, number of incomplete connections, total transmitted packets, total received packets, transmitted Goodput packets, received Goodput packets, packet drops/loss, etc. As understood by those skilled in the art, Goodput can be measured in Mbits/s (or Gbits/s) and is the amount of throughput that is the actual bits of data to be transferred. This measure basically removes all overhead of the connection, network, etc. For example, if connections require retransmission, the number of packets required to transfer a certain amount of actual data will be much higher than without retransmission. Therefore Goodput would be higher without retransmission than with them.

Open connections queue 208 is maintained by engine 202 contains information for all clients, servers, VLANs, etc. that are currently active. According to aspects of the invention, unlike conventional TCP stacks, only a minimum amount of information is kept comprising 64 bytes for each TCP connection, for example. This information does not have to be looked up each time a new response is received as with conventional TCP stacks, which makes operation of the device extremely fast. Rather, according to aspects of the invention, queue 208 is mainly used as a mechanism to simulate network latency by delaying sending packets to DUT 104. In other words, the present invention recognizes that in actual operating conditions there is a distance between a client and server, therefore there is typically a delay between the time the client sends a packet and client receives the response from the server. Therefore, the server in a real network must keep a large amount of open TCP connections in the same time. Some conventional test equipment send many short connections but they don't emulate the actual long distances between client and server, and therefore the DUT has few opened connections at the same time.

Accordingly, in embodiments, queue 208 keeps a single entry for each connection in a circular buffer/queue, which ensures that the DUT 104 will have to keep corresponding state information for as many connections are in the queue. In embodiments, queue 208 is therefore used to keep the TCP connections open on line, therefore keeping them open in the DUT which keeps the resources in the DUT taken up by each connection. This makes sure that the DUT cannot keep its connection tables purely in cache where the speed and latency are much faster than by moving the connection state data into regular memory. Contrary to DUT 104, and according to aspects of the invention, test equipment 102 does not keep the full state of the connection, therefore keeping the test system memory overhead low.

As will be explained in more detail below, in example embodiments, as each connection is started (e.g. a new simulated client and simulated server pair are created), 64 bytes of corresponding information is put into circular queue 208 (e.g. a FIFO). When the queue is full (e.g. the maximum number of open connections has been reached) engine 202 uses the 64 bytes of information from queue 208 to build the full packet and send it.

As mentioned above, engine 202 receives response packets from DUT 104. According to aspects of the invention, unlike conventional TCP stacks that maintain state information, all the information needed to generate new packets in accordance with the state of the connection, or to close the connection, is kept in the packet contents and queue 208, as will be explained in more detail below.

Although not necessary for all embodiments of the invention, as shown in FIG. 2, preferred embodiments include test files 210. These are used to create packet contents, rather than custom test patterns as is performed in some prior art techniques. For example, a user can specify the information contained in the test files 210, such as malware or other known malicious content.

Equipment 102 can also include administrator interface for configuring and initiating tests, viewing results, configuring test files 210, etc. According to aspects of the invention, this can include a Web-based GUI interface with graphical easy-to-understand result reporting.

In embodiments, the operation of test equipment 102 for performing tests of DUT 104 can include an overall test methodology that is similar to conventional overall test methodologies. In other words, like conventional methodologies, test equipment 102 is configured to stress DUT 104 in many ways to characterize its performance. This can include, for example, determining the maximum number of connections per second, determining the maximum number of active connections, determining total amount of Goodput, etc.

Unlike conventional methodologies, however, aspects of the invention include the ability to perform such stress tests with low connection overhead, thereby reducing the memory and other resources needed in equipment 102. Aspects further include the use of real data such as known virus files and the like, rather than customized test data as is used in some conventional methods. Aspects can further include the use of only a common network protocol such as TCP, rather than a whole variety of network protocols, as in some conventional approaches.

An example methodology performed by embodiments of the invention, and which implements certain low connection overhead aspects of the invention, will be described in connection with the flowchart in FIG. 3.

In step S302, a TCP connection is started with the DUT 104 by sending a TCP SYN packet. In example embodiments, fields of the IP/TCP header of the SYN packet (e.g. source and destination addresses, ports, etc.) are chosen from the ranges provided by the user configuration. For example, in embodiments of test equipment 102, starting the TCP connection includes creating a simulated client and simulated server pair in the test equipment 102 (using IP addresses in the configured range). In example embodiments, an administrator configures a base IPv4 address for the client(s) and/or server(s), and test equipment 102 uses these base address(es) to create the simulated client and/or server address(es). When a new connection is to be opened, engine 202 checks queue 208 for the next available address(es) in the configured range to use. This could be done incrementally or by an algorithm. Then once the connection is open, a new 64 byte entry containing the simulated server and/or simulated client IP address is added to queue 208. In embodiments, the user also configures maximum segment size (MSS).

As is known, a typical HTTP/GET transaction includes a TCP SYN (Client to Server), a TCP SYNACK (Server to Client), an HTTP Get (Client to Server), HTTP OK (with data included) (Server to Client), ACK (Client to Server saying it received the data), and RST with ACK (Server saying goodbye and closing the connection). There are variants on this sequence based on clients, servers, browsers, etc.

Given the information about each TCP connection (i.e. client and server addresses) in queue 208, and with knowledge of typical HTTP/GET transactions, when receiving TCP SYN packet, the simulated server side of the test equipment 102 knows how to build a corresponding TCP SYNACK packet, and from this packet the simulated client side of the test equipment knows how to build a subsequent HTTP GET request, and consequently the server side knows how to build the HTTP DATA packet to respond to HTTP GET requests.

When receiving HTTP DATA packets, the client knows when the last packet arrives, and so it initiates the connection termination.

In embodiments, several hash functions are used to generate packets and/or to ensure the test transaction proceeds as expected. For example, a hash function using as input the TCP/IP fields src IP, dst IP, src TCP port, dst TCP Port, source eth port, vlan id is used to generate a file index. For example, to ensure that each connection always uses data from the same file, the hash function can be designed to generate the same index number given the same unique combination of TCP/IP fields.

Another hash function using as inputs the TCP/IP fields src IP, dst IP, src TCP port, dst TCP Port, source eth port, vlan id can be used to generate Initial sequence number (ISNs), for clients and/or servers. In other embodiments, these numbers are constant (e.g. the number 1 can be used as the initial sequence number for all connections). Yet another function using as inputs the TCP/IP fields src IP, dst IP, src TCP port, dst TCP Port, source eth port, vlan id is used to generate an IP identification index. In embodiments, all packets belonging to the same index use the same common counter to increment 16 bit identification field of the IP header. This ID is used to check for missing or duplicate packets.

In step S304, packets containing a test file are transmitted from the simulated server to the simulated client via the connection to the DUT. As described above, in embodiments, an HTTP GET process is initiated to start the test file transfer. According to aspects of the invention described above, transferring a complete file of a known size using HTTP GET has a highly predictable sequence of packets from start to finish. As such, the full TCP connection state does not need to be maintained in order to maintain information about the status of the file transfer (i.e. the current offset in the file based on the amount of bytes already transferred).

There are several ways to keep information regarding the status of the file transfer. In one example described above, the Layer2-IP-TCP header information is hashed to a global parameter that provides the file index, which can also be used to tell if the TCP packet has to be acked, or if out of order or drop has to be simulated. In another example, the offset information could be kept in the packet data itself (e.g. in the sequence, ACK and/or port number in the header). In another example, a combination of a function of a packet data (some way of doing hashing) and packet content information (e.g. sequence number) is used to figure out the Wget file and offset in the file.

In an example where offset information is kept in the packets themselves, step S304 can further include writing the proper information into the packets (e.g. in the sequence, ACK and/or port number in the header) to update the status of the file transfer.

In embodiments, step S304 can also include implementing TCP algorithms such as standard off-the-shelf implementations in Linux and Windows, etc. It should be noted that these algorithms require keeping the full state of the connection. Those skilled in the art of standard TCP/HTTP stacks will understand how to implement such algorithms.

In step S306, response packets are received from the DUT. Depending on how the file transfer status is maintained, a determination is made whether the entire contents of the file have been transferred in step S308. For example, if the information is maintained in the packet itself (e.g. in the sequence, ACK and/or port number in the header), the current value in the response packet is compared to the final expected value to determine if the whole file has already been transferred.

If not, control returns to step S304. In the example where information of the file transfer status is kept in the packets themselves, the contents of the response packets are used to determine new packets to send. Otherwise, if the entire transfer has completed, control advances to step S310, where the connection is closed using a FIN or RST packet. In this step, information regarding the connection is removed from queue 208, and counters 206 are updated. Further, a new connection can be started if testing is not complete.

In embodiments, to keep a connection open, rather than closing a connection immediately, a FIN or RST packet is delayed, information about which is maintained in queue 208.

Figure 3:
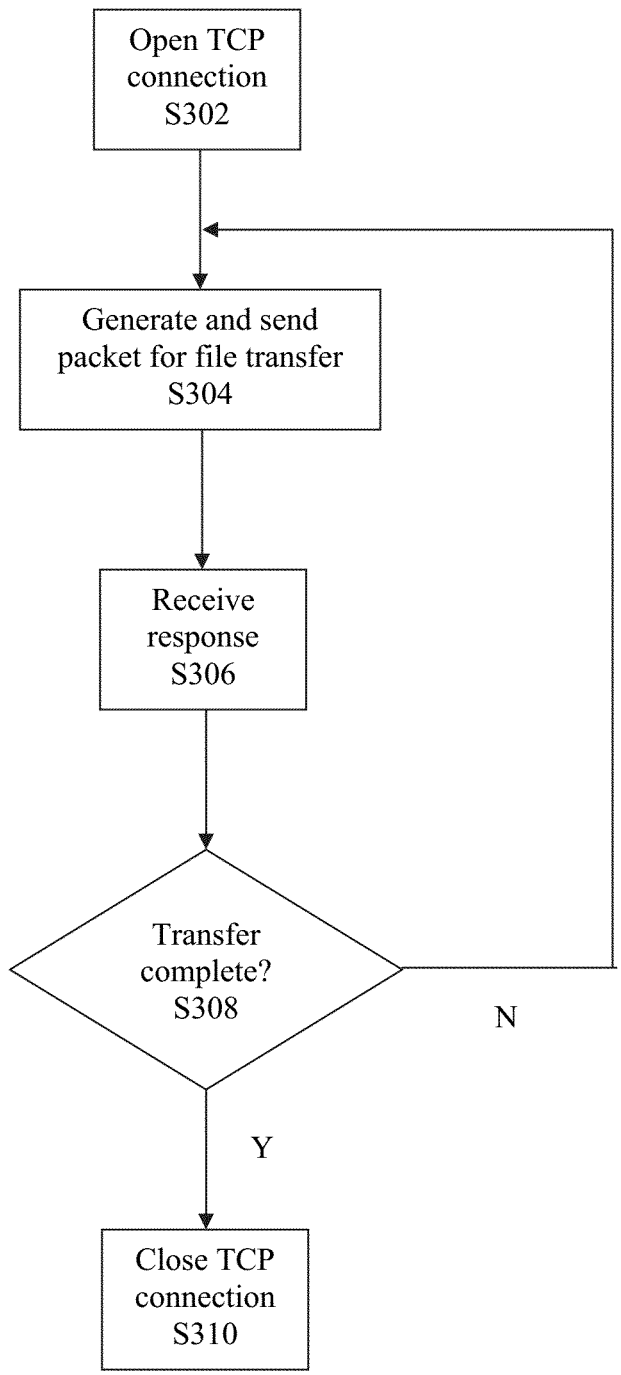
FIG. 3 is a flowchart illustrating an example methodology that allows lightweight TCP according to embodiments of the invention.

It should be apparent that although FIG. 3 only shows a methodology for one single connection that there can be many, and likely thousands or more, simultaneous connections open between test equipment 102 and DUT 104. However, the overhead required to maintain these connections is much lower than conventional techniques.

Moreover, as described previously, certain or all of the steps shown in FIG. 3 can include use of the queue 208 to simulate latency. For example, after a TCP SYN packet is sent from a simulated client to a simulated server, rather than immediately creating and sending a SYN ACK packet from the simulated server to the simulated client, test engine 202 places an entry into queue 208. This entry includes the minimal amount of information to uniquely identify the connection (e.g. source and destination addresses, port, etc.), as well as the type of packet that needs to be generated. When queue 208 is full, test engine 202 can then pop the oldest entry from the queue and create the appropriate packet to be sent. For example, if the entry indicates that a SYN ACK packet needs to be sent, test engine 202 uses the information in the entry to create the header and contents of a SYN ACK packet and sends it to the simulated client via DUT 104. It should be apparent that many different mechanisms can be used to manage the size and timing of filling and emptying queue 208.

Figure 4:
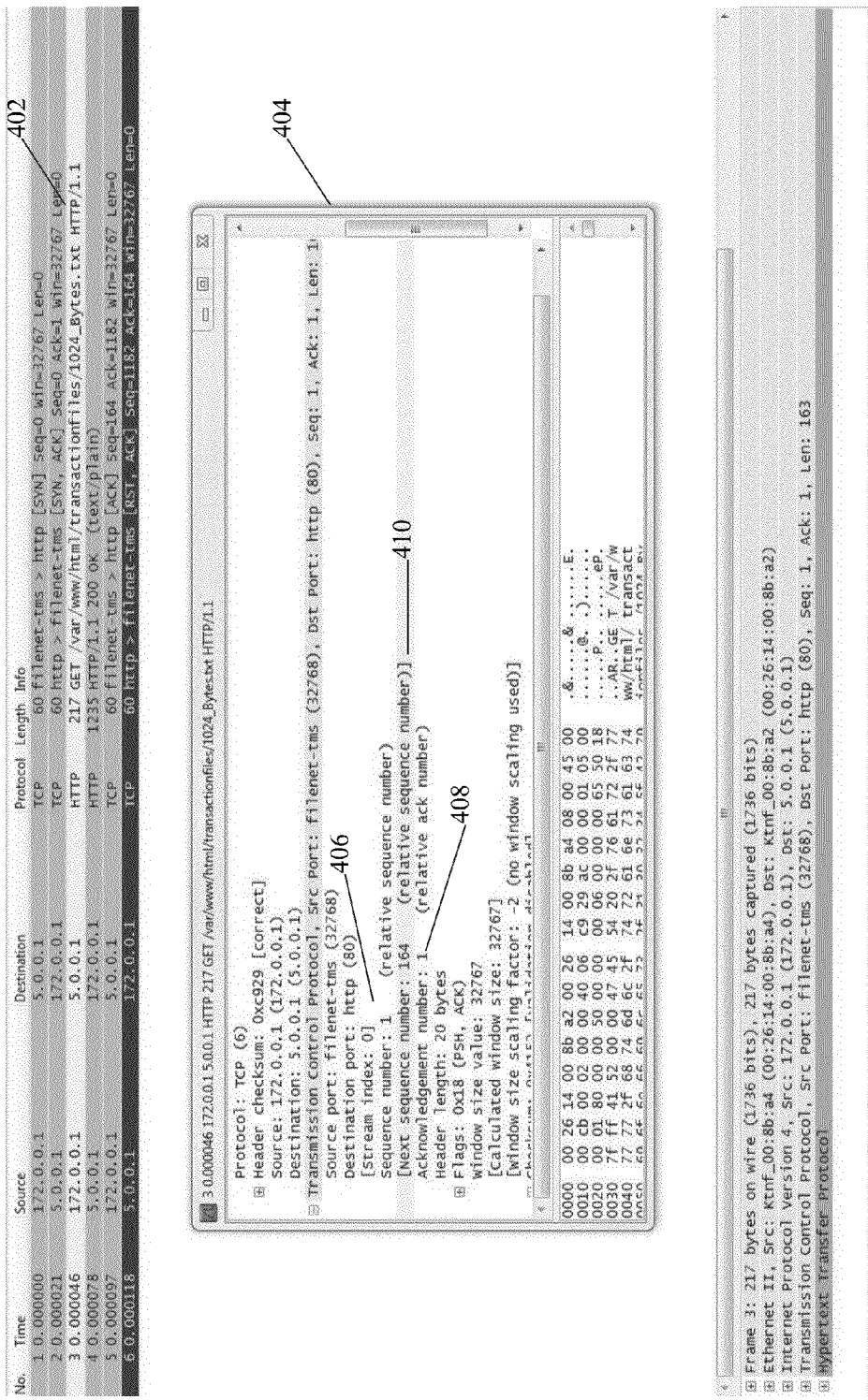
FIG. 4 illustrates an example exchange of packets in a methodology according to embodiments of the invention.

One example of how file transfer connection status information can be maintained within packets is shown in FIG. 4. As shown in FIG. 4, the file transfer is initiated using an HTTP GET in packet 402. In this example, the name of the test file is 1024_Bytes.txt, located at path/var/www/html/transactionfiles. The simulated client address on the test equipment 102 for this connection is 172.0.0.1 and the simulated server address is 5.0.0.1. The contents of this packet is shown in more detail in viewer 404. As shown, in the initial GET packet 402, the sequence number 406 is 1 and the acknowledgment number 408 is 1. As further shown, the expected acknowledgment number 410 in an initial response packet is 164. This is determined by a hash function, for example.

In response to the HTTP GET packet, the server responds with packet 410. As shown, as expected for the initial response, acknowledgment number is 164. According to an embodiment of the invention, the next packet sent will include the number 164 in the sequence number of the header to continue the sequence. The expected acknowledgment number for this connection will also be updated.

As set forth previously, embodiments of test equipment 102 according to the invention can include a process-driven easy-to-use Web GUI interface to configure and run tests on equipment such as DUT 104.

Figure 5:
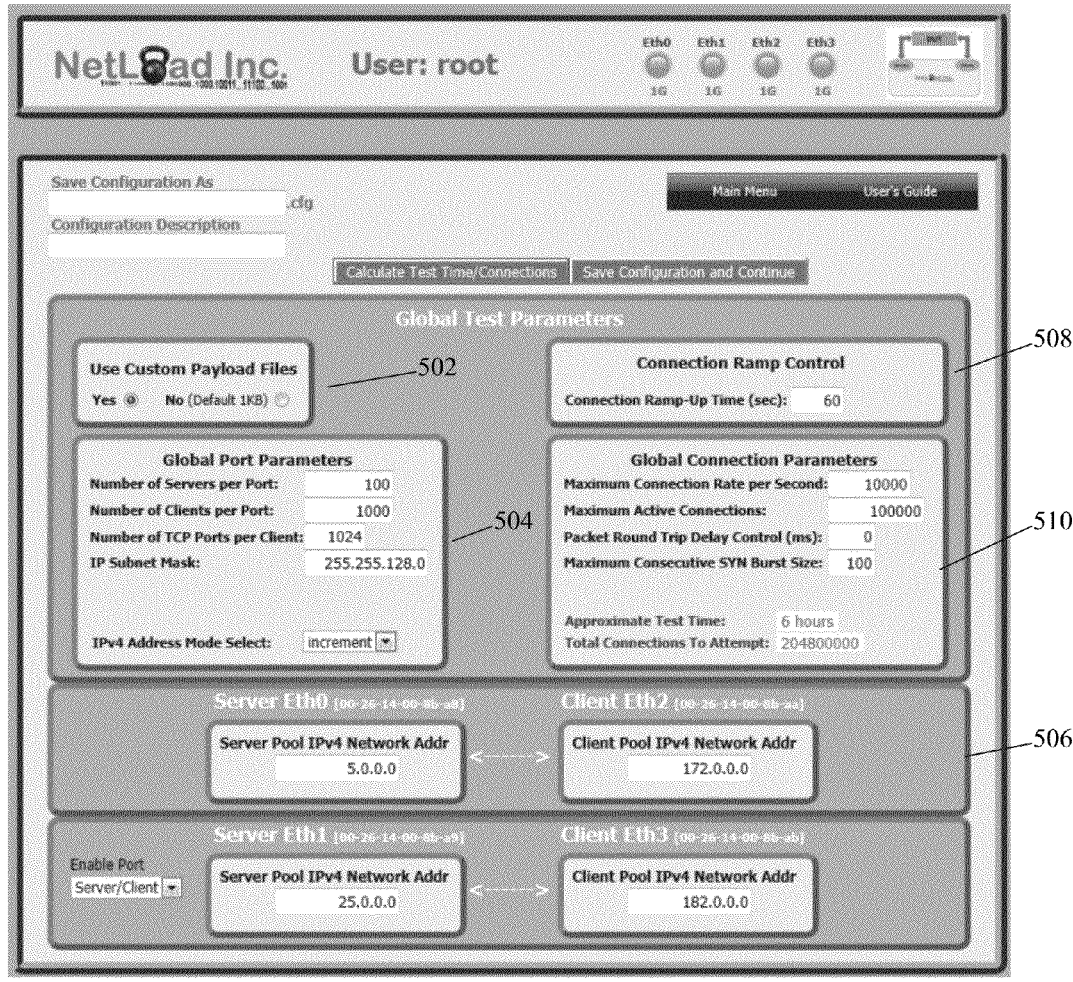
FIG. 5 is a screenshot illustrating an example GUI according to embodiments of the invention.

FIG. 5 is a screenshot illustrating an example interface in accordance with aspects of the invention. In this example, interface 500 allows a user to configure various parameters for performing tests on DUT 104.

As shown, interface 500 includes configuration option region 502, which allows users to select performing tests using their own custom payload files, such as known virus files. As shown in this example, if custom files are not selected, tests will be performed with a default 1K size file. It should be apparent that other user interface functionality can be included to select and upload custom files onto test equipment 102.

Configuration option region 504 allows users to specify global test parameters such as the number of servers per port, the number of clients per port, the number of TCP ports per client, an IP subnet mask, and an IPv4 address mode. It should be noted that certain or all of these parameters can have default values that the user can override.

Configuration option region 506 allows users to specify IPv4 network addresses for emulated servers and clients. As shown in this example, the test equipment includes two Ethernet port pairs, which are Server-Client pairs. Although IPv4 is shown in this example, the invention could easily apply to IPv6.

Configuration option region 508 allows users to specify a connection ramp-up time. This is useful for making the connection ramp slower for the DUT not to be overwhelmed by a large influx of simultaneous connection starts. This presents a more realistic test scenario and allows the DUT to be tested under different conditions. The opposite would be true with no ramp to simulate a sever condition, or simulate a Denial of Service Attack conditions.

Configuration option region 510 allows users to specify global connection parameters such as maximum connection rate per second, maximum active connections, packet round trip delay time, maximum consecutive SYN burst size, approximate test time, and total number of connections to attempt. It should be noted that certain or all of these parameters can have default values that the user can override.

It should be noted that the test configuration shown in FIG. 5 is just one example of the types of test configurations that can be made in accordance with the invention. For example, FIG. 5 illustrates a basic setup where test equipment 102 emulates servers and clients. However, there can be many variations and further configurations, such as configuring test equipment 102 to emulate virtual LANs, virtual routers, virtual routers with VLANs, etc. Moreover, there can include additional screens and configurations for specifying user payload files, selecting among default test files, launching, saving and reusing tests, viewing currently running test results, viewing results of previous tests, etc.

Figure 6:
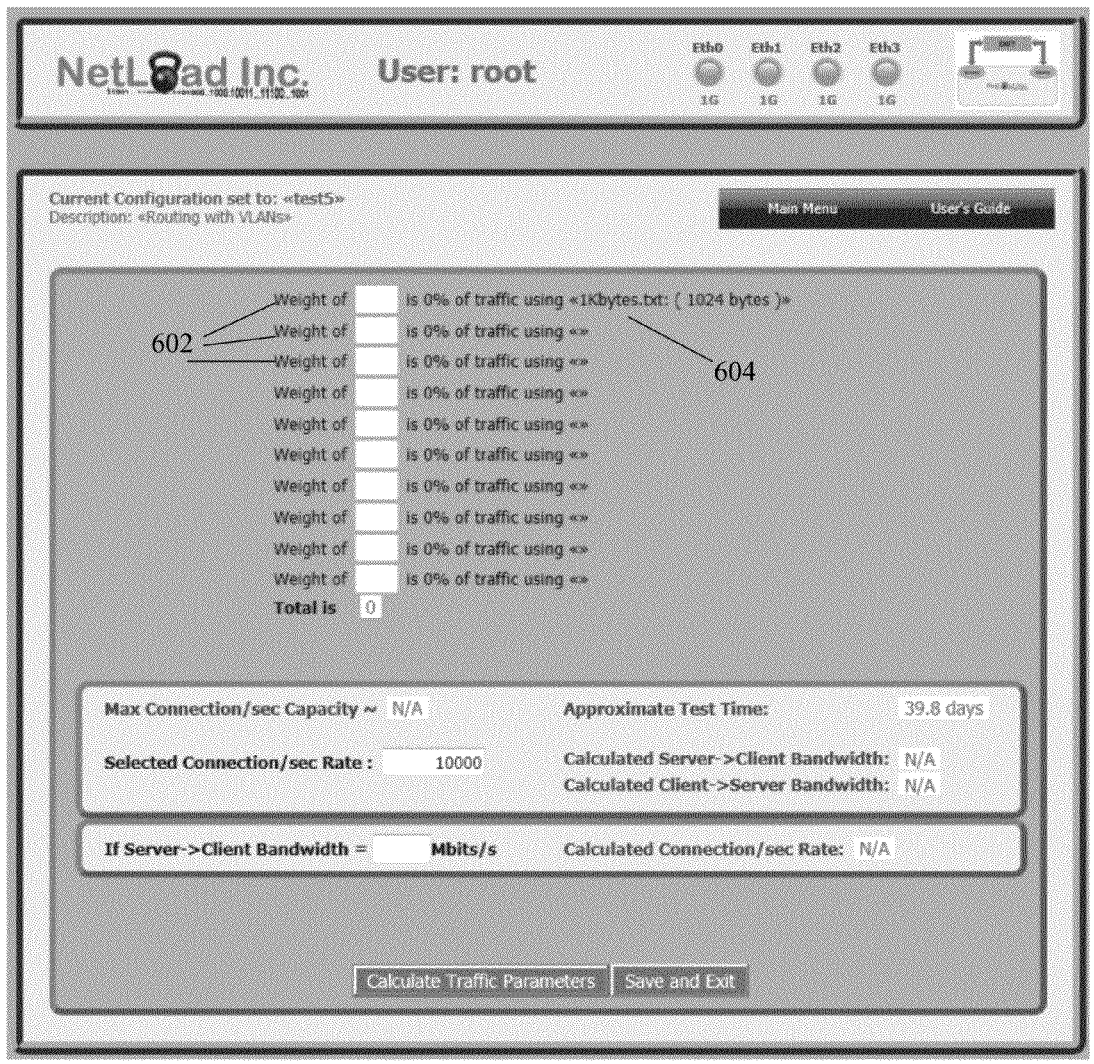
FIG. 6 is a screenshot illustrating example test configuration options that can be included in tests performed by embodiments of the invention.

Moreover, embodiments of the invention provide the ability to even further control the types of traffic that are used in tests. One example implementation of this functionality is illustrated in FIG. 6. As shown in FIG. 6, users are allowed to assign weights 602 to different types of payload files 604 that are used during tests. Using these weights, test equipment 102 will mix the payload file download in the ratio as defined by the weights. For example, this allows the user to transfer one malicious content file for many non-malicious files, and make sure this file is flagged by the DUT.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
    initiating, using computer implemented test equipment, a test transaction via a network device under test using transmission control protocol (TCP), the test transaction comprising a plurality of packets, a server end and a client end; and
    completing the test transaction by transmitting the plurality of packets between the server end and the client end via the network device under test without maintaining TCP state information at the test equipment,
    wherein the test equipment simulates both the server end and the client end of the test transaction.

2. A method according to claim 1, wherein TCP state information needed to complete the test transaction is maintained in contents of the plurality of packets.

3. A method according to claim 1, wherein the test transaction comprises a file transfer between a server and client, and wherein payloads of the plurality of packets are constructed using contents of the file.

4. A method according to claim 3, wherein the file transfer comprises a HTTP GET request.

5. A method according to claim 3, wherein the file transfer comprises a HTTP PUT request.

6. A method according to claim 3, further comprising providing a user interface that allows the file to be selected from among a plurality of different files by a user.

7. A method according to claim 3, wherein information regarding a status of a completion of all the contents of the file transfer is maintained in contents of the plurality of packets.

8. A method according to claim 1, wherein the test transaction uses HTTP.

9. A method according to claim 1, wherein the test transaction uses HTTPS.

10. A method according to claim 1, wherein the test transaction uses FTP.

11. A method according to claim 1, wherein completing further includes:
    receiving a response to one of the plurality of packets from the network device under test;
    using a hash function to generate a number using addresses of one or both of the server end and the client end of the test transaction; and
    using the generated number to construct a next one of the plurality of packets.

12. An apparatus comprising:
    computer implemented test equipment comprising a test engine that is configured to:
        initiate a test transaction via a network device under test using transmission control protocol (TCP), the test transaction comprising a plurality of packets, a server end and a client end; and
        complete the test transaction by transmitting the plurality of packets between the server end and the client end via the network device without maintaining TCP state information at the test equipment,
        wherein the test engine is configured to simulate both the server end and the client end of the test transaction.

13. An apparatus according to claim 12, wherein TCP state information needed to complete the test transaction is maintained in contents of the plurality of packets.

14. An apparatus according to claim 12, wherein the test transaction comprises a file transfer between a server and client, and wherein payloads of the plurality of packets are constructed using contents of the file.

15. An apparatus according to claim 12, further comprising an open connections queue to simulate network latency.

16. An apparatus according to claim 12, wherein test engine is further configured to complete the test transaction by:

receiving a response to one of the plurality of packets from the network device under test;

using a hash function to generate a number using addresses of one or both of the server end and the client end of the test transaction; and using the generated number to construct a next one of the plurality of packets.

\* \* \* \* \*